United States Patent
Krishnakumar et al.

(10) Patent No.: US 10,551,988 B2
(45) Date of Patent: Feb. 4, 2020

(54) MULTI-INPUT DISPLAY

(71) Applicant: Dell Products L.P., Round Rock, TX (US)

(72) Inventors: Karthikeyan Krishnakumar, Round Rock, TX (US); Boon Heng Koh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 195 days.

(21) Appl. No.: 15/056,795

(22) Filed: Feb. 29, 2016

(65) Prior Publication Data
US 2017/0249055 A1  Aug. 31, 2017

(51) Int. Cl.
*G09G 5/14* (2006.01)
*G06F 3/0481* (2013.01)

(52) U.S. Cl.
CPC ............ *G06F 3/0481* (2013.01); *G09G 5/14* (2013.01)

(58) Field of Classification Search
CPC ........ H04N 3/27; H04N 5/445; H04N 21/431; H04N 21/44; H04N 5/06; H04N 5/44; G06F 3/0484; G06F 3/048; G09G 5/14; G09G 5/00
See application file for complete search history.

(56) References Cited

U.S. PATENT DOCUMENTS

| | | | |
|---|---|---|---|
| 2009/0259967 A1* | 10/2009 | Davidson | G06F 3/0481 715/799 |
| 2011/0187929 A1* | 8/2011 | Suzuki | H04N 3/27 348/554 |
| 2015/0007068 A1* | 1/2015 | Lilley | G06F 3/0481 715/762 |
| 2015/0067713 A1* | 3/2015 | Yamagishi | H04N 21/431 725/19 |
| 2015/0304526 A1* | 10/2015 | Maurice | H04N 21/4307 348/513 |
| 2017/0092226 A1* | 3/2017 | Park | G09G 5/006 |
| 2017/0094342 A1* | 3/2017 | Lugtenberg | H04N 21/235 |
| 2018/0005603 A1* | 1/2018 | Saroor | G06F 3/1454 |

* cited by examiner

*Primary Examiner* — Ibahim A Khan

(74) *Attorney, Agent, or Firm* — Baker Botts L.L.P.

(57) ABSTRACT

A multi-input display device may, responsive to a user-selection, divide a display region into different regions corresponding to display data received at different input graphics ports. Display metadata for each display region may be individually transmitted to each respective source of the display data.

20 Claims, 3 Drawing Sheets

300 — METHOD FOR CONFIGURING A MULTI-INPUT DISPLAY DEVICE

302 GENERATE AN ONSCREEN DISPLAY MENU AT A MULTI-INPUT DISPLAY DEVICE

304 RECEIVE USER INPUT FROM THE ONSCREEN DISPLAY MENU, THE USER INPUT SPECIFYING SIMULTANEOUS DISPLAY OUTPUT FROM A PLURALITY OF DISPLAY SOURCES AND SPECIFYING A PLURALITY OF DISPLAY REGIONS CORRESPONDING TO THE DISPLAY SOURCES

306 BASED ON THE USER INPUT, SEND, TO EACH OF THE DISPLAY SOURCES, RESPECTIVE DISPLAY METADATA INDICATIVE OF EACH RESPECTIVE DISPLAY REGION

308 RECEIVE, FROM EACH OF THE DISPLAY SOURCES, RESPECTIVE DISPLAY DATA CORRESPONDING TO THE RESPECTIVE DISPLAY METADATA

310 DISPLAYING THE DISPLAY DATA RESPECTIVELY IN THE DISPLAY REGIONS

FIG. 3

MULTI-INPUT DISPLAY

BACKGROUND

Field of the Disclosure

This disclosure relates generally to information handling system displays and, more particularly, to a multi-input display.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Display devices, such as liquid crystal displays (LCDs) are commonly integrated within portable information handling systems configured in the form of laptop, notebook, netbook, and tablet computers, among others, and personal mobile devices, such as smart phones. Desktop or non-portable information handling systems also use display devices, which are often implemented as separate devices with input ports for graphical display signals. With some larger display formats, display devices may output display data from multiple input sources, such as with picture-by-picture (PBP) or picture-in-picture (PIP) modes. When conventional displays output display data from multiple input sources, the quality of the resulting picture may be unsatisfactory for many users.

SUMMARY

In one aspect, a disclosed method is for configuring multi-input display devices. The method may include receiving user input at a multi-input display device, the user input specifying simultaneous display output from a plurality of display sources and specifying a plurality of display regions corresponding to the display sources. Based on the user input, the method may also include sending, to each of the display sources, respective display metadata indicative of each respective display region, receiving, from each of the display sources, respective display data corresponding to the respective display metadata, and displaying the display data respectively in the display regions.

In any of the disclosed embodiments of the method, the user input may be received from an onscreen display menu generated by the multi-input display device.

In any of the disclosed embodiments of the method, display metadata may be stored in a non-volatile memory accessible to a monitor controller included in the multi-input display device. In the method, the non-volatile memory may be external to the monitor controller.

In any of the disclosed embodiments of the method, the display metadata may conform to an extended display identification data (EDID) standard.

In any of the disclosed embodiments of the method, the display data may be received in a rendered format to a display size of the respective display region corresponding to the display source.

In any of the disclosed embodiments of the method, the plurality of display sources may include four digital display sources.

Other disclosed aspects include a non-transitory computer-readable medium storing instructions executable by a monitor controller of a multi-input display device, and a multi-input monitor, including a monitor controller having access to a memory, storing instructions executable by the monitor controller.

BRIEF DESCRIPTION OF THE DRAWINGS

For a more complete understanding of the present invention and its features and advantages, reference is now made to the following description, taken in conjunction with the accompanying drawings, in which:

FIG. 3 is flowchart depicting selected elements of an embodiment of a method for configuring a multi-input display.

DESCRIPTION OF PARTICULAR EMBODIMENT(S)

Figure 1:
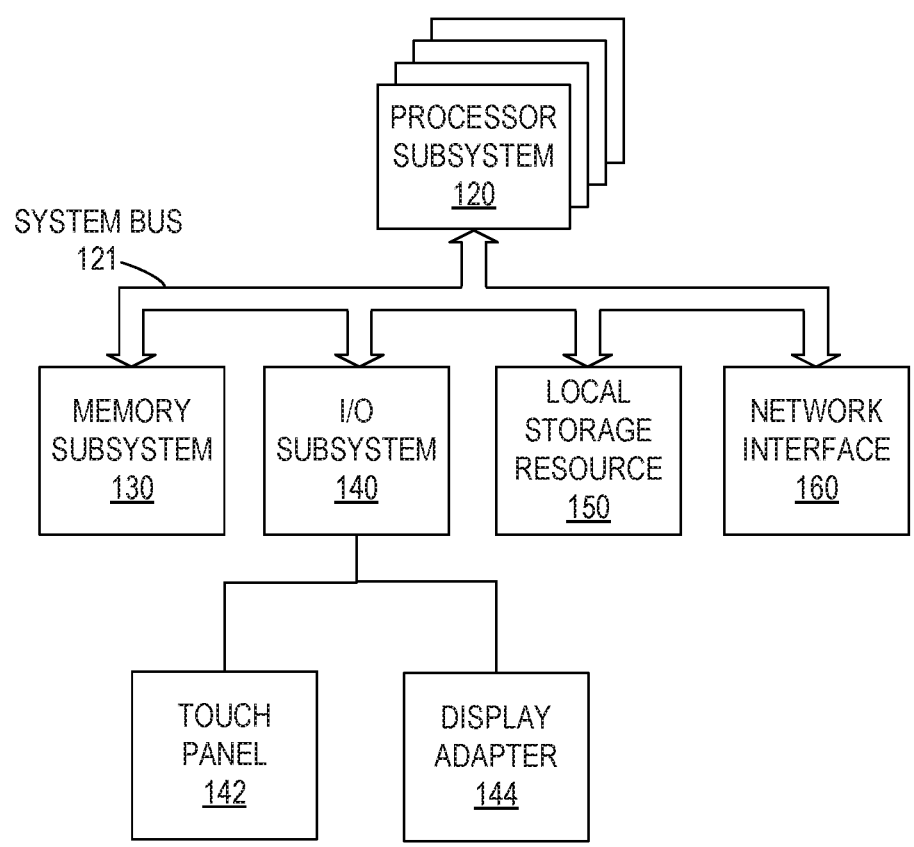
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU)

or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), or flash memory (SSD), as well as communications media such wires, optical fibers, microwaves, radio waves, and other electromagnetic or optical carriers, or any combination of the foregoing.

As larger displays become more widespread with certain information handling systems, the ability to integrate display inputs from different sources on a single display screen becomes increasingly desirable. For example, some larger format display devices may simultaneously output display data from multiple input sources in different display regions, such as with picture-by-picture (PBP) or picture-in-picture (PIP) modes. As will be described in further detail, the inventors of the present disclosure have developed methods and systems disclosed herein for intelligently operating a multi-input display, such that display data from each input source is rendered to the native resolution of each respective display region by a graphics processor generating the display data. For this purpose, the multi-input display may, in response to user input, send display metadata to the graphics processor corresponding to the native resolution of each respective display region, instead of display metadata for the entire multi-input display. The display metadata may comply with an extended display identification data (EDID) standard.

Figure 2:
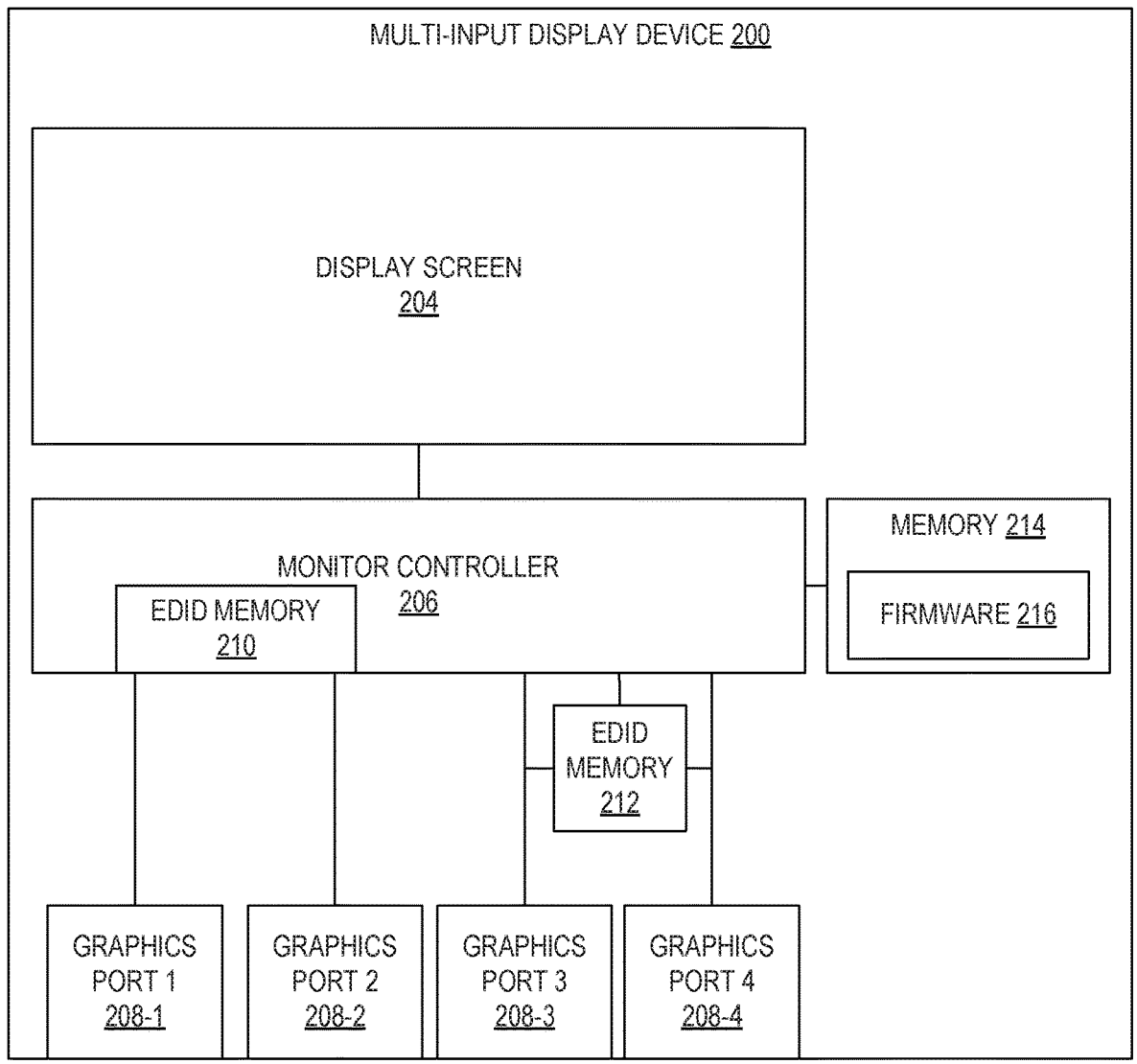
FIG. 2 is a block diagram of selected elements of an embodiment of a multi-input display device.

Particular embodiments are best understood by reference to FIGS. 1, 2, and 3 wherein like numbers are used to indicate like and corresponding parts.

Turning now to the drawings, FIG. 1 illustrates a block diagram depicting selected elements of an embodiment of information handling system 100. As described herein, information handling system 100 may represent a personal computing device, such as a personal computer system, a desktop computer, a laptop computer, a notebook computer, etc., operated by a user. In various embodiments, information handling system 100 may be operated by the user using a keyboard and a mouse (not shown).

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 and various components associated therewith may be implemented using hardware, software, or any combination thereof.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130). In the same or alternative embodiments, processor subsystem 120 may interpret and execute program instructions and process data stored remotely (e.g., in a network storage resource, not shown).

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage, or a suitable selection or array of volatile or non-volatile memory that retains data after power to its associated information handling system, such as system 100, is powered down. Local storage resource 150 may comprise computer-readable media (e.g., hard disk drive, floppy disk drive, CD-ROM, or other type of rotating storage media, flash memory, EEPROM, or another type of solid state storage media) and may be generally operable to store instructions and data. In system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. As shown, I/O subsystem 140 may comprise touch panel 142 and display adapter 144. Touch panel 142 may include circuitry for enabling touch functionality in conjunction with a display (see FIG. 3) that is driven by display adapter 144. It is noted that when information handling system 100 is a laptop computer with an integrated display device, display adapter 144 may provide connectivity for an external display, such as multi-input display device 200 (see FIG. 2).

As noted previously, a user of information handling system 100 may desire to display the output from display adapter 144 as well as the output from other sources on a single display. As will be described in further detail herein, information handling system 100, and in particular display adapter 144, may support operation with a multi-input display that is enabled to simultaneously display graphical content from at least two different sources.

Turning now to FIG. 2, a block diagram of selected elements of an embodiment of multi-input display device 200 is illustrated. In some embodiments, multi-input display device 200 may represent a stand-alone device that may be coupled to one or more information handling systems to output display data. It is noted that certain elements of multi-input display device 200 are illustrated in FIG. 2 for descriptive clarity and it will be understood that multi-input display device 200 may include additional components, in different embodiments. As used herein, the term "output" with regard to display data shall refer to display of optical elements (i.e., pixels) representing the display data on a display screen 204 and may represent a continuing process where the display data is constantly updated at a given refresh rate.

As shown in FIG. 2, multi-input display device 200 accordingly includes display screen 204 and monitor controller 206. Display screen 204 may represent any of a variety of display screens and may be implemented in a fixed resolution corresponding to a number of pixels included within display screen 204. In some embodiments, display screen may be enabled for a resolution of 3840×2160 pixels (referred to as '4K resolution'). In some embodiments, display screen 204 may include an actively illuminated element, such as a backlight (not shown). Display screen 204 may be implemented using various types of display technology, including, but not limited to, light-emitting diodes (LED), liquid crystal displays (LCD), plasma displays, etc. Monitor controller 206 may include processing capability to receive display data and generate corresponding control signals to drive display screen 204. Monitor controller 206 may further include internal processing capability, such as for rescaling display data to different display regions and aspect ratios.

In FIG. 2, multi-input display device 200 is shown including four graphics ports 208, namely graphics port 1 208-1, graphics port 2 208-2, graphics port 3 208-3, and graphics port 4 208-4. Each graphics ports 208 may represent a wired interface for receiving display data from an external source, such as an information handling system (e.g., via display adapter 144, see FIG. 1) and may be different types of ports or a different instance of the same type of port. Graphics ports 208 may be analog ports (e.g., video graphics adapters (VGA), among others) or digital ports (e.g., digital video interface (DVI), high-definition multimedia interface (HDMI), display port (DP), among others). Particularly when graphics ports 208 are digital ports, graphics ports 208 may support bidirectional communication with an information handling system to both receive display data and to send/receive other information, such as display control information, including display metadata comprising extended display identification data (EDID).

In multi-input display device 200, monitor controller 206 and memory 214 represent data processing functionality where memory 214 may store data and instructions executable by monitor controller 206. Memory 214 is shown including firmware 216, which may represent instructions executable by monitor controller 206 to perform various functionality. Also shown in FIG. 2 are EDID memory 210 and 212, as examples of local storage of display metadata in EDID format. In various embodiments EDID memory 210 and 212 may be non-volatile memory, such as one or more EEPROMs among other types of non-volatile memory. EDID memory 210 may represent an internal memory included with monitor controller 206, which may represent an integrated circuit device that is commercially available. EDID memory 212 may represent an additional memory external to monitor controller 206 that is shown coupled to graphics port 3 208-3 and graphics port 4 208-4 in the exemplary embodiment depicted in FIG. 2.

For example, firmware 216 may include instructions to generate an onscreen display (OSD), which may be a menu system with configuration options and parameters that may be operated by a user of multi-input display device 200. In certain embodiments, a user may activate PBP or PIP mode in the OSD and may indicate specific display inputs that are active at respective graphics ports for individual respective display regions. The individual display regions may be of varying size and position on display screen 204. For example, when multi-input display device 200 provides 4K resolution, in PBP mode, four individual display regions having native resolution of 1920×1080 pixels may be respectively and individually generated by display data arriving at respective graphics ports 208 from up to four different sources.

In operation, multi-input display device 200 may store display metadata corresponding to the native resolution of display screen 204 (e.g., 4K resolution) at EDID memory 210. When an external device, such as display adapter 144, is coupled to a graphics port 208, multi-input display device 200 may normally send the stored display metadata to the external device. The external device may then generate, for example by digital rendering, the display data in a native format according to the received display metadata, corresponding to full native resolution of display screen 204.

However, when a user of multi-input display device 200 activates intelligent operation of multi-input display device 200, such as from the OSD enabled by firmware 216, multi-input display device 200 may then retrieve additional display metadata, such as from EDID memory 212, corresponding to a PBP mode or a PIP mode, as desired. Then, multi-input display device 200 may send the display metadata corresponding to the multi-input mode (PBP or PIP) for each respective display region selected by the user to each respective external device via graphics ports 208. As a result, the external device will begin to natively render the display data sent to multi-input display device 200 at the respective graphics port 208 in the resolution for each respective target display region. In this manner, monitor controller 206 may avoid having to internally rescale the display data for each display region, which may result in a poor quality picture, and instead, high quality native rendered display data may be received and output to each respective display region.

It is noted that the layout and arrangement of EDID memory 210 and 212 as depicted in FIG. 2 is an exemplary embodiment shown for descriptive clarity. In some implementations, all display metadata is stored at EDID memory 210 for each one of graphics ports 208. In some embodiments, EDID memory 212 may store all display metadata. In particular embodiments, EDID memory 210 may store display metadata for graphics ports 1 208-1 and graphics port 2 208-2, while EDID memory 212 may store display metadata for graphics ports 3 208-3 and graphics port 4 208-4. In various embodiments, firmware 216 may be enabled to retrieve and send display metadata from any one or more of EDID memory 210 and 212.

Referring now to FIG. 3, a block diagram of selected elements of an embodiment of method 300 for configuring a multi-input display device, as described herein, is depicted in flowchart form. In various embodiments, method 300 is performed by multi-input display device 300 (see FIG. 2). It is noted that certain operations described in method 300 may be optional or may be rearranged in different embodiments.

In FIG. 3, method 300 begins at step 302 by generating an onscreen display menu at a multi-input display device. At step 304, user input is received from the onscreen display menu, the user input specifying simultaneous display output from a plurality of display sources and specifying a plurality of display regions corresponding to the display sources. Based on the user input, at step 306, respective display metadata indicative of each respective display region is sent to each of the display sources. At step 308, respective display data corresponding to the respective display metadata is received from each of the display sources. At step 310, the display data are displayed respectively in the display regions.

As described herein, a multi-input display device may, responsive to a user-selection, divide a display region into different regions corresponding to display data received at different input graphics ports. Display metadata for each display region may be individually transmitted to each respective source of the display data.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
a multi-input display device generating an onscreen display menu for a display screen of the multi-input display device;
the multi-input display device receiving, via the onscreen display menu, user input, the user input specifying simultaneous display output from a plurality of display sources, respectively coupled to a plurality of hardware graphics ports of the multi-input display device, and specifying a plurality of display regions on the display screen corresponding to the display sources, wherein at least two of the plurality of display regions on the display screen are configured for a picture-by-picture (PBP) mode;
the multi-input display device accessing a plurality of non-volatile extended display identification data (EDID) memories, of the multi-input display device, that store display metadata, wherein each of the plurality of non-volatile EDID memories is coupled to at least one of the plurality of hardware graphics ports of the multi-input display device;
based on the user input, the multi-input display device sending, to each of the plurality of display sources via each respective hardware graphics port of the plurality of hardware graphics ports, respective display metadata, from at least one of the plurality of non-volatile EDID memories, indicative of a resolution of each respective display region of the plurality of display regions on the display screen of the multi-input display device;
the multi-input display device receiving, via the plurality of hardware graphics ports, from each of the plurality of display sources, respective display data rendered to the respective resolution corresponding to the respective display region, indicated via the respective display metadata; and
the multi-input display device displaying, via the display screen, the respective display data from each of the plurality of display sources at a respective resolution of the respective display data in the respective display region of the multi-input display device indicated in the respective display metadata, wherein a first resolution of first display data from a first display source of the plurality of display sources, coupled to a first hardware graphics port of the plurality of hardware graphics ports, displayed in a first display region of the plurality of display regions is different than a second resolution of second display data from a second display source of the plurality of display sources, coupled to a second hardware graphics port of the plurality of hardware graphics ports, different from the first hardware graphics port, displayed in a second display region, different from the first display region, wherein at least the first display region and the second display region are in the PBP mode.

2. The method of claim 1, wherein the plurality of non-volatile EDID memories are accessible to a monitor controller included in the multi-input display device.

3. The method of claim 2, wherein at least one of the plurality of non-volatile EDID memories is external to the monitor controller.

4. The method of claim 1, wherein the display metadata conforms to an extended display identification data (EDID) standard.

5. The method of claim 1, wherein the display data is received in a rendered format to a display size of the respective display region corresponding to the display source.

6. The method of claim 1, wherein the plurality of display sources includes at least four digital display sources.

7. The method of claim 1,
wherein the multi-input display device includes a touch panel; and
wherein the multi-input display device receiving the user input includes the multi-input display device receiving the user input via the touch panel.

8. A non-transitory computer-readable medium that stores instructions, that, when executed by a monitor controller of a multi-input display device, cause the multi-input display device to:
generate an onscreen display menu for a display screen of the multi-input display device;
receive, via the onscreen display menu, user input, the user input specifying simultaneous display output from a plurality of display sources, respectively coupled to a plurality of hardware graphics ports of the multi-input display device, and a plurality of display regions on the display screen corresponding to the plurality of display sources, wherein at least two of the plurality of display regions on the display screen are configured for a picture-by-picture (PBP) mode;

access a plurality of non-volatile extended display identification data (EDID) memories, of the multi-input display device, that store display metadata, wherein each of the plurality of non-volatile EDID memories is coupled to at least one of the plurality of hardware graphics ports of the multi-input display device;

based on the user input, send, to each of the plurality of display sources via each respective hardware graphics port of the plurality of hardware graphics ports, respective display metadata indicative of a resolution of each respective display region of the plurality of display regions on the display screen of the multi-input display device;

receive, via the plurality of hardware graphics ports, from each of the plurality of display sources, respective display data rendered to the respective resolution corresponding to the respective display region, indicated via the respective display metadata; and simultaneously display, via the display screen, the respective display data from each of the plurality of display sources at a respective resolution of the respective display data in the respective display region of the multi-input display device indicated in the respective display metadata, wherein a first resolution of first display data from a first display source of the plurality of display sources, coupled to a first hardware graphics port of the plurality of hardware graphics ports, displayed in a first display region of the plurality of display regions is different a second resolution of second display data from a second display source of the plurality of display sources, coupled to a second hardware graphics port of the plurality of hardware graphics ports, different from the first hardware graphics port, displayed in a second display region of the plurality of display regions, different from the first display region, wherein at least the first display region and the second display region are in the PBP mode.

9. The computer-readable medium of claim 8, wherein the plurality of non-volatile EDID memories are accessible to the monitor controller.

10. The computer-readable medium of claim 9, wherein at least one of the plurality of non-volatile EDID memories is external to the monitor controller.

11. The computer-readable medium of claim 8, wherein the display metadata conforms to an extended display identification data (EDID) standard.

12. The computer-readable medium of claim 8, wherein the display data is received in a rendered format to a display size of the respective display region corresponding to the display source.

13. The computer readable medium of claim 8, wherein the plurality of display sources includes at least four digital display sources.

14. The computer-readable medium of claim 8,
wherein the multi-input display device includes a touch panel; and
wherein, to receive the user input, the instructions further cause the multi-input display device to receive the user input via the touch panel.

15. A multi-input monitor, comprising:
a display screen;
a plurality of hardware graphics ports;
a plurality of non-volatile extended display identification data (EDID) memories, wherein each of the plurality of non-volatile EDID memories is coupled to at least one of the plurality of hardware graphics ports; and
a monitor controller having access to a memory and to the plurality of hardware graphics ports, wherein the memory stores instructions that, when executed by the monitor controller, cause the multi-input monitor to:
generate an onscreen display menu;
receive, via the onscreen display menu, user input, the user input specifying simultaneous display output from a plurality of display sources, respectively coupled to the plurality of hardware graphics ports, and a plurality of display regions on the display screen corresponding to the plurality of display sources, wherein at least two of the plurality of display regions on the display screen are configured for a picture-by-picture (PBP) mode;
access the plurality of non-volatile EDID memories that store display metadata;
based on the user input, send, to each of the plurality of display sources, respective display metadata indicative of a resolution of each respective display region of the plurality of display regions on the display screen;
receive, via the plurality of hardware graphics ports, from each of the plurality of display sources, respective display data rendered to the respective resolution corresponding to the respective display region, indicated via the respective display metadata; and
simultaneously display, via the display screen, the respective display data from each of the plurality of display sources at a respective resolution of the respective display data in the respective display region of the multi-input display device indicated in the respective display metadata, wherein a first resolution of first display data from a first display source of the plurality of display sources displayed in a first display region of the plurality of display regions is different than a second resolution of second display data from a second display source of the plurality of display sources displayed in a second display region of the plurality of display regions, different from the first display region, wherein at least the first display region and the second display region are in the PBP mode.

16. The multi-input monitor of claim 15, wherein the plurality of non-volatile EDID memories are accessible to the monitor controller.

17. The multi-input monitor of claim 16, wherein at least one of the plurality of non-volatile EDID memories is external to the monitor controller.

18. The multi-input monitor of claim 15, wherein the display metadata conforms to an extended display identification data (EDID) standard.

19. The multi-input monitor of claim 15, wherein the display data is received in a rendered format to a display size of the respective display region corresponding to the display source.

20. The multi-input monitor of claim 15, further comprising:
a touch panel;
wherein, to receive the user input, the instructions further cause the multi-input monitor to receive the user input via the touch panel.

* * * * *